United States Patent [19]

Kwon

[11] Patent Number: 5,418,658
[45] Date of Patent: May 23, 1995

[54] DIGITAL VIDEO SIGNAL RECORDING/REPRODUCING APPARATUS FOR LONGER PLAYING TIME

[75] Inventor: Oh-Sang Kwon, Seoul, Rep. of Korea
[73] Assignee: Daewoo Electronics Co., Ltd., Seoul, Rep. of Korea
[21] Appl. No.: 231,931
[22] Filed: Apr. 25, 1994
[30] Foreign Application Priority Data
   Jun. 4, 1993 [KR] Rep. of Korea .............. 93-10124
[51] Int. Cl.$^6$ .............. G11B 5/09; G11B 15/12; H04N 5/76; H04N 5/78
[52] U.S. Cl. .............. 360/48; 360/51; 360/61; 360/33.1; 358/335
[58] Field of Search .............. 360/48, 61, 64, 51, 360/33.1; 358/335

[56] References Cited

U.S. PATENT DOCUMENTS

| | | | |
|---|---|---|---|
| 4,963,992 | 10/1990 | Doi et al. | 360/33.1 |
| 5,065,259 | 11/1991 | Kubota et al. | 358/335 |
| 5,291,283 | 3/1994 | Kondo et al. | 348/390 |
| 5,343,251 | 8/1994 | Nafeh | 358/335 |

Primary Examiner—A. Psitos
Assistant Examiner—Won Tae C. Kim
Attorney, Agent, or Firm—William F. Pinsak

[57] ABSTRACT

An apparatus for recording and reproducing an encoded video signal from a source encoder comprises a decoder for performing a decoding process for the encoded video signal to produce a decoded video signal, an encoder block for compressing the decoded video signal using a spatial correlation to produce an intra mode compression signal, a buffer memory for storing the intra mode compression signal, a mode controller for generating a clock pulse used to read out data in the buffer memory in accordance with a longer playing time recording and a normal playing time recording and a recording and reproducing unit for recording and reproducing the intra mode compression signal read from the buffer memory.

4 Claims, 1 Drawing Sheet

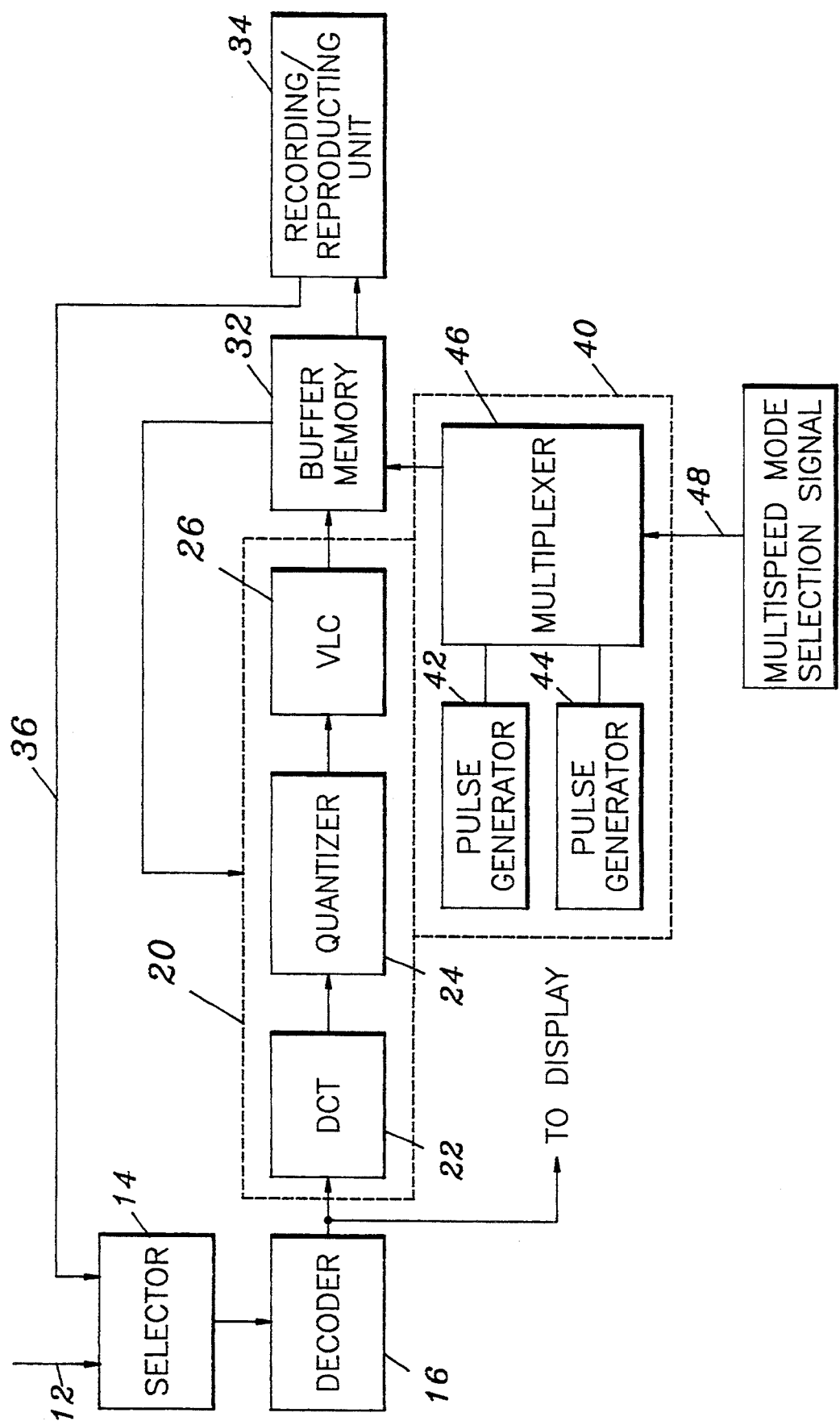

DIGITAL VIDEO SIGNAL RECORDING/REPRODUCING APPARATUS FOR LONGER PLAYING TIME

FIELD OF THE INVENTION

The present invention relates to an apparatus for recording and reproducing a digital video signal; and, more particularly, to an improved digital video signal recording and reproducing apparatus adapted for a longer playing time.

DESCRIPTION OF THE PRIOR ART

As is well known, a digital video tape recorder ("VTR") records and reproduces a video signal in a digital form. The digital video signal may be a pulse code modulated ("PCM") signal which is obtained by performing a sampling operation on the video signal in such a manner that satisfies the so-called Nyquist condition. The digital VTR of the type described above is disclosed in an article entitled, "Digital Video Recording Techniques Using ½" Metal Particle Tape" by S. Mita et al., *IEEE Consumer Electronics*, 386-397 (August, 1985).

In addition, there is proposed a digital VTR for compressing a digital video signal by employing a high-efficiency coding technique based on Hadamard transformation in order to elongate the recording and reproducing time per unit length of a recording tape (see C. Yamamitsu et al., "High Density Recording and Bit Rate Reduction for a 2-hour Digital VTR", *Video Audio & Data Recording*, 113-120 (March 1986)). However, the digital VTR proposed by Yamamitsu is silent on the possibility or mechanism of compressing a digital video signal in a standard playing mode or a longer playing mode.

U.S. Pat. No. 4,963,992 issued to Nobukazu Doi et al. discloses an apparatus for recording/reproducing a digital video signal in both standard and extended playing modes through the use of a sub-Nyquist sampling operation. The apparatus comprises a first and a second sub-Nyquist sampling circuits, each of which samples the digital video signal to produce a first and a second sampled signals which do not define the same data within the digital video signal. Both the first and the second sampled signals are combined and recorded in a standard mode while either the first or the second sampled signal is selected and then recorded in the extended playing mode.

While the Doi patent provides an improved recording and reproducing apparatus over the Yamamitsu system, it requires two signal paths through which both the first and the second sampled signals are passed, thereby complicating its signal processing.

Further, there is no known prior art system which offers an apparatus for recording and reproducing an encoded video signal supplied from a source encoder.

SUMMARY OF THE INVENTION

It is, therefore, an object of the invention to provide an apparatus which is capable of recording and reproducing a digital video signal in a compressed form.

It is another object of the invention to provide a digital video signal recording and reproducing apparatus operable for an extended playing time.

In accordance with the present invention, there is provided an apparatus for recording and reproducing an encoded video signal supplied from a source encoder, which comprises a decoder for decoding the encoded video signal to produce a decoded video signal, an encoder block for compressing the decoded video signal using an intraframe correlation to produce an intra mode compression signal, a buffer memory for storing the intra mode compression signal, a mode controller for generating a clock pulse for use to read out data from the buffer memory in response to a multi-speed recording mode which includes a standard mode for a normal playing time and an extended mode for a longer playing time, and a recording/reproducing unit for recording and reproducing the intra mode compression signal read from the buffer memory.

BRIEF DESCRIPTION OF THE DRAWING

The above and other objects and features of the present invention will become apparent from the following description of preferred embodiments taken in conjunction with the accompanying drawing which is a block diagram illustrative of the inventive apparatus for recording and reproducing a digital video signal in a compressed form.

DETAIL DESCRIPTION OF THE PREFERRED EMBODIMENTS

Referring to the drawing, there is shown a block diagram of an apparatus for recording and reproducing a digital video signal in accordance with the present invention.

A digital video signal for recording is supplied through line 12 to a selector 14 for selecting a signal to be recorded on a recording media or a signal reproduced from the recording media. The digital video signal may include an encoded video signal in a compressed form applied through the use of a conventional encoding system. The conventional encoding system may use a video compression technique for the transmission of digital video signals through a conventional communication channel. Such compression techniques can be classified into three categories.

A first category of such compression techniques known in the art is the so-called predictive method, also known as the interframe coding, which is based on the concept of reducing the redundancy between neighboring frames. This method is described, for example, in Ninomiya and Ohtsuka, "A Motion-Compensated Interframe Coding Scheme for Television Pictures", *IEEE Transactions on Communications, COM*-30, No. 1 (January, 1982), which is incorporated herein by reference.

A second category of the coding methods comprises a transform technique which utilizes the redundancy existing in a single frame. This coding technique, which exploits only the spatial correlation, is called the intraframe coding. This technique is described in, e.g., Chen and Pratt, "Scene Adaptive Coder", *IEEE Transactions Communications, COM*-32, No. 3 (March, 1984), which is incorporated herein by reference.

A third category of the compression techniques is built on the concept of combining the first and the second categories of techniques(see Staffan Ericsson, "Fixed and adaptive Predictors for Hybrid Predictive/Transform Coding", *IEEE Transactions on Communication, Com*-33, No. 12 (December, 1985)), which is also incorporated herein by reference.

The encoded video signal is applied to a decoder 16 of a conventional design which performs the inversion or decoding of the encoding operation performed by any one of the encoding techniques described above. The decoder 16 produces a decoded video signal which may be a PCM signal defining a sequence of video frames, each frame being defined by a set of pixel data. The decoded video signal is then supplied to an encoder block In the encoder block 20, the decoded video signal from the decoder 16 is subjected to an encoding process. In accordance with the present invention, the encoder block 20 is designed to process the decoded video signal in an intraframe coding mode using a spatial correlation without motion compensation to produce an intra mode compression signal. The encoder block 20 comprises a discrete cosine transform ("DCT") coder 22, a quantizer 24 and a variable length coder( "VLC") 26. These are conventional elements commonly used in a DCT compression system, as described in the Chen and Pratt article referred to above. In order to carry out the DCT compression, each video frame is divided into blocks of pixels (usually N×N sized square blocks). Each block of pixels is transformed by the DCT transform coder 22 into a set of intra mode transform coefficients. The set of transform coefficients is quantized by the quantizer 24, by controlling the quantization step size, into an intra mode quantization signal and then supplied to the VLC 26. The VLC 26 assigns variable length codewords to the intra mode quantization signal to produce at its output the intra mode compression signal at an irregular bit rate. In this case, since the encoder block 20 can be implemented with the intraframe coding part only in an encoding system, except for the encoding system using the interframe coding, it is possible to simplify the encoder block 20 in its circuit configuration.

The intra mode compression signal from the VLC 26 is sent to a buffer memory 32 in which certain digital data is written at an irregular bit rate and from which the digital data is read out at a constant bit rate. A mode controller 40 is used to generate a clock pulse for use to read out the data from the buffer memory 32 in order to achieve a multispeed recording operation, as used in a conventional analog VTR, which includes a standard mode for a normal playing time and an extended mode for a longer playing time. The mode controller 40 comprises a first pulse generator 42, a second pulse generator 44 and a multiplexer 46. The first pulse generator 42 produces a first read clock pulse having a clock frequency for the normal playing time and the second pulse generator 44 produces a second read clock pulse having a clock frequency for the longer playing time, wherein the clock frequency of the second clock pulse is lower than that of the first clock pulse. Both the first and the second clock pulses are provided to the multiplexer 46. The multiplexer 46 selects either the first or the second clock pulse in response to a multispeed recording mode selection signal through line 48. In case where the first clock pulse is selected by the multiplexer 46, the data is read from the buffer memory 32 at a bit rate of, e.g., 20 Mbps. However, in case where the second clock pulse is selected by the multiplexer 46, the data is read from the buffer memory 32 at a bit rate of, e.g., 10 Mbps.

In this connection, the amount of the data remaining in the buffer memory 32 is continuously monitored through a control unit (not shown) which also controls the quantization step size of the quantizer 24 so that the data does not either overflow or empty completely.

That is, the quantization step size is changed in accordance with the amount of the data remaining in the buffer memory. If, for example, the amount of the data in the buffer memory 32 is increased, it causes to increase the quantization step size of the quantizer 24 so that the incoming data rate into the buffer memory 32 becomes lowered. However, if the amount of the data remaining in the buffer memory is decreased, the quantization step size of the quantizer 24 will be refined or reduced.

Thereafter, the data read from the buffer memory 32 is sent to a recording and reproducing unit 34 for its recording on the recording media such as a tape (not shown).

Hereinafter, the reproducing operation of the present embodiment will be further explained. When the reproducing operation is performed in the digital VTR, the recording/reproducing unit 34 reproduces the video signal recorded on the recording media under the control of a system controller (not shown) and provides it to the selector 14 through line 36. The system controller also causes the selector 14 to select the reproduced video signal from the recording/reproducing unit 34 and transfer it to the decoder 16. As described above, the decoder 16 performs the decoding operation for the reproduced video signal to produce a video signal for the longer playing time or the normal playing time depending on its multispeed recording mode, which will be indicated on a display (not shown). In connection with the reproducing operation, it will be appreciated that the reproduced video signal will pass through only the part that performs the intraframe coding within the decoder 16 because the reproduced video signal is coded in the intraframe mode within the encoder block 20 and recorded on the recording media. As well known in the art, the detection of the compression mode in the decoder 16 can be readily achieved by employing a decision bit which may be used to identify either the intraframe mode or the interframe mode.

While the present invention has been shown and described with respect to the preferred embodiments, it will be apparent to those skilled in the art that many changes and modifications may be made without departing from the spirit and scope of the invention as defined in the appended claims.

What is claimed is:

1. An apparatus for recording and reproducing an encoded video signal supplied from a source encoder, which comprises:
    means for decoding the encoded video signal to produce a decoded video signal defining a sequence of frames;
    means for encoding the decoded video signal using an intraframe correlation to produce an intra mode compression signal, said encoding means including an intra mode transformer for transforming the decoded video signal into a set of intra mode transform coefficients, an intra mode quantizer for quantizing the set of intra mode transform coefficients using a quantization step size to produce an intra mode quantization signal and a variable length coder for coding the intra mode quantization signal to produce the intra mode compression signal at an irregular bit rate;
    means for storing the intra mode compression signal;
    means for generating a clock pulse for use to read out data from said storing means in response to a multispeed recording mode including a standard mode for a normal playing time and an extended mode for a longer playing time; and means for recording the intra mode compression signal read from said storing means and reproducing the recorded intra mode compression signal.

2. The apparatus as recited in claim 1, wherein said clock pulse generating means includes a first clock generator for generating a first clock pulse having a first clock frequency for the normal playing time, a second clock generator for generating a second clock pulse having a second clock frequency for the longer playing time and means for selectively supplying the first or the second clock pulse to said storing means in response to a multispeed recording mode selection signal, wherein the second clock frequency is lower than the first clock frequency.

3. The apparatus as recited in claim 2, wherein the quantization step size of the quantizer is controlled in accordance with the amount of the data remaining in the storing means.

4. The apparatus as recited in claim 3, which further comprises means for selecting either the encoded signal from the source encoder for the recording thereof or the reproduced signal from said recording and reproducing means for the displaying thereof, wherein the selected signal from said selecting means is applied to said decoding means.

\* \* \* \* \*